Patented May 13, 1941

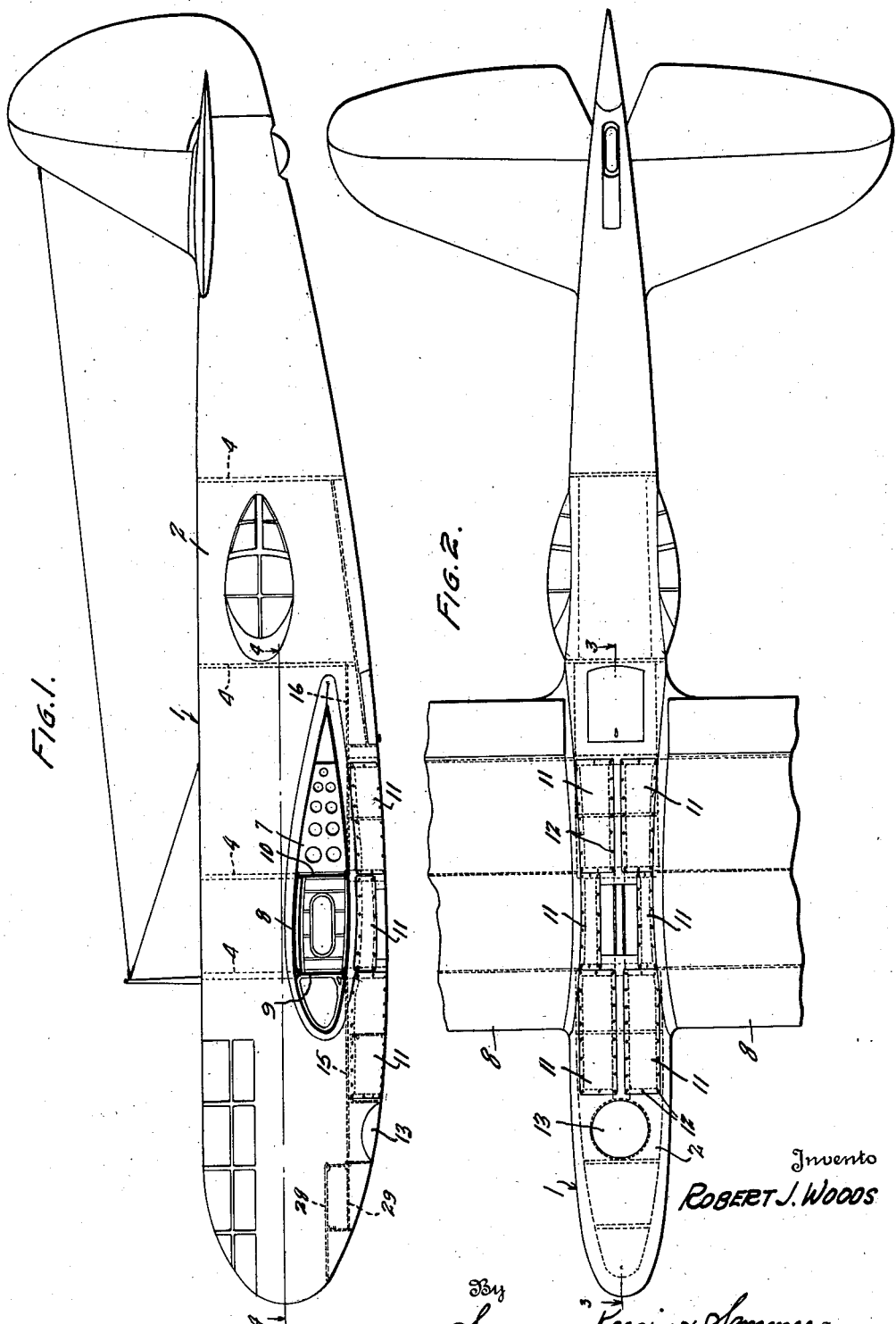

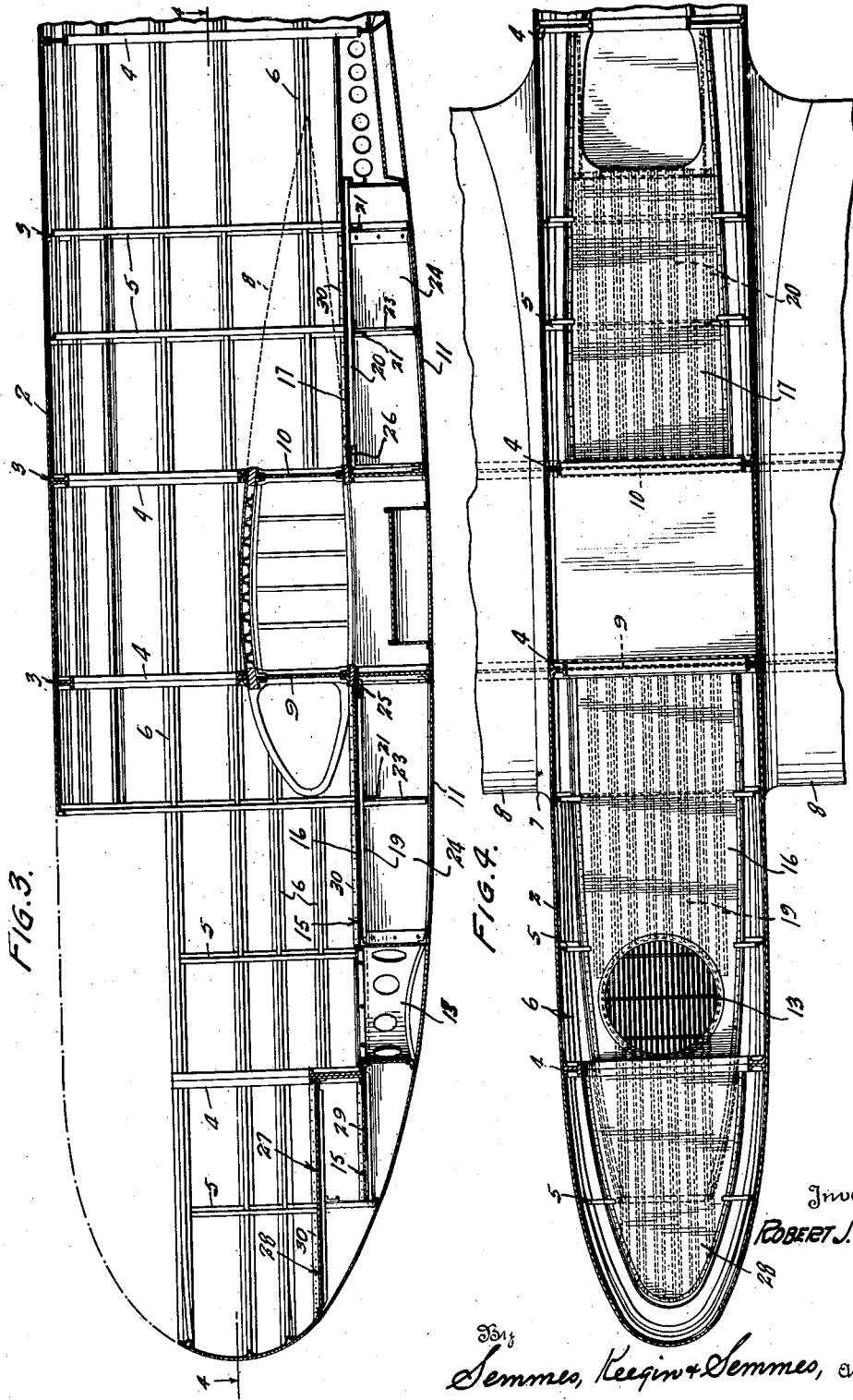

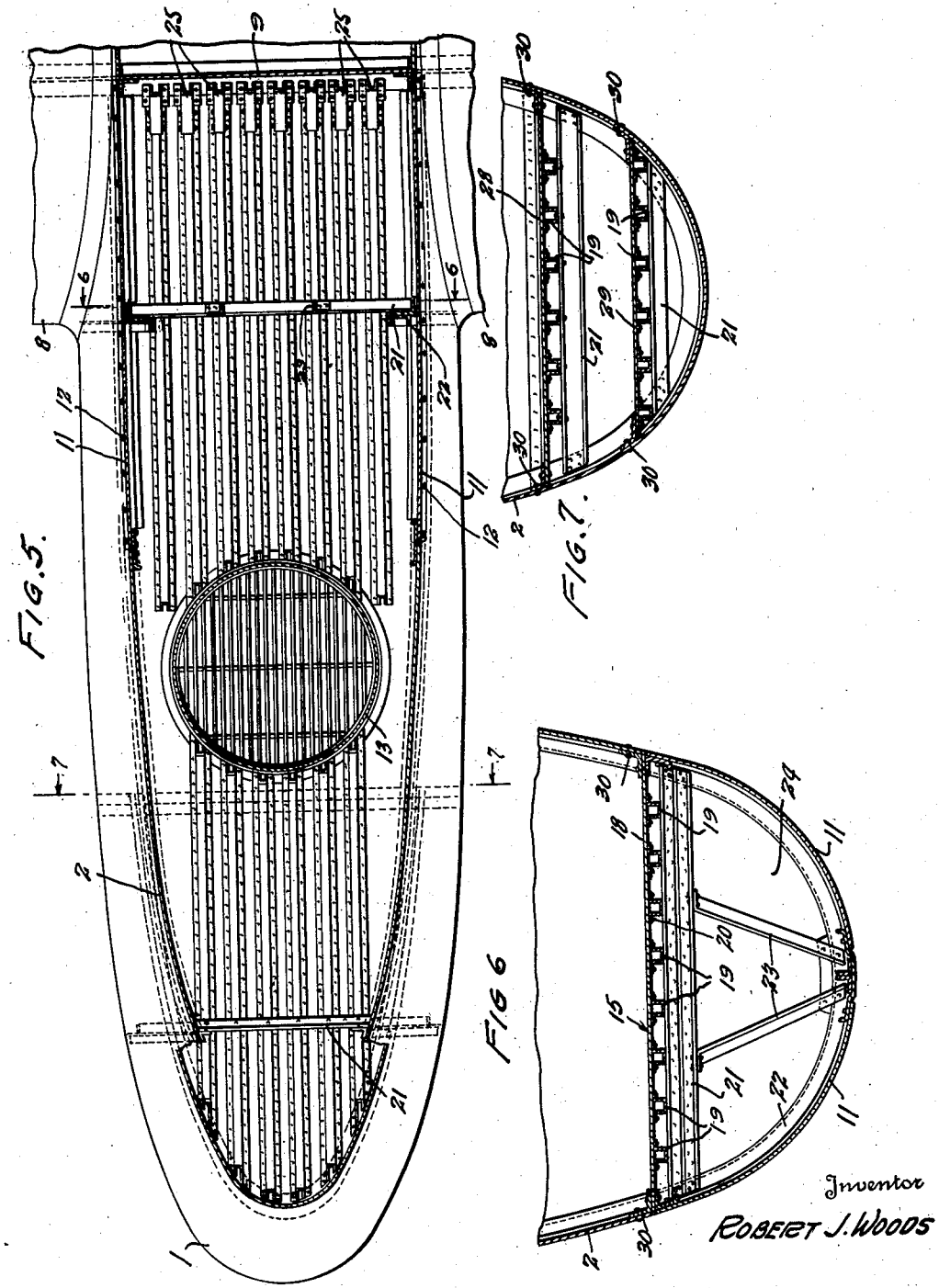

2,242,199

UNITED STATES PATENT OFFICE 2,242,199

AIRPLANE FLOOR AND COWLING CONSTRUCTION

Robert J. Woods, Grand Island, N. Y., assignor to Bell Aircraft Corporation, Buffalo, N. Y., a corporation of New York Application August 24, 1938, Serial No. 226,571

8 Claims. (Cl. 244—117)

This invention relates to airplane construction and more particularly to a fuselage of monocoque structure, the structure of which is strengthened by a structural member which is also used as a floor in place of the outer skin of the fuselage, a portion of which is readily removable. A compartment is formed between this floor and the removable outer skin which may be used to store fixed equipment.

Hitherto, the fuselage of airplanes have not been provided with a floor which is an independent structure. Because of this limitation in construction, the fuselage had to be constructed with a continuous outer skin, which was either used as a floor or directly supported a structure which was so used.

In this type of construction it is necessary to mount the fixed equipment above the floor. It is obvious that this arrangement tends to greatly obstruct the passageways thereby making it desirable to enlarge the fuselage. This enlargement of the fuselage necessarily involves an increase in weight and reduces the speed of the plane because of the increase in frontal area.

One of the objects of my invention is to provide a fuselage for an airplane, a portion of the outer skin beneath said fuselage being in the form of a removable cowling.

Another object of my invention is to provide a fuselage which is provided with a structural member which serves as a floor in place of the removable outer skin of the said fuselage.

Still another object of my invention is to provide a floor for the fuselage of an airplane which completes the structure of the fuselage.

Yet another object of my invention is to provide a floor for the fuselage of an airplane which is so constructed that it provides protection for a storage place in which may be placed various types of equipment.

A further object of my invention is to provide a raised floor for the fuselage of an airplane which forms part of the structure of said fuselage, the forward part of said floor being used by the pilot and the remaining portion being adapted for the use of the radio operator and his equipment.

With these and other objects in view, this invention consists in a novel construction of a fuselage for an airplane. The fuselage which forms the basis of this invention is of the monocoque type having an outer skin supported by internal structural members. The under surface of this fuselage is provided with a removable outer skin which is in the form of one or more detachable cowlings. Mounted within the fuselage above this removable cowling is a structural member which is used as a floor and is securely attached to the structural members which support both the fuselage and the main airfoil of the airplane.

This floor may be constructed in two sections which are separated by the beams which form the chief support of the main airfoil, or the floor may be constructed in one piece. The space between this flooring and the removable cowling is utilized as a storage space for equipment. The third portion of the floor in the nose of the ship is not positioned over the removable cowlings but is provided with a subflooring which is constructed and braced in the same manner as the main flooring.

By means of this construction the structural members of the fuselage are provided with an additional brace, and it is possible to provide the fuselage with a removable cowling situated beneath the floor. Moreover, storage space which is readily accessible from the exterior of the fuselage is provided for necessary equipment, thereby allowing the fuselage to be designed with smaller dimensions. This curtailment of dimensions decreases the weight of the fuselage and the front plate area thereby increasing the speed and maneuverability of the airplane.

In the drawings:

Figure 1 is a side elevational view of the fuselage of an airplane.

Figure 2 is a top plan view of the under surface of the fuselage shown in Figure 1.

Figure 3 is a view taken along line 3—3 of Figure 2, looking in the direction of the arrows.

Figure 4 is a view taken along line 4—4 of Figure 3, looking in the direction of the arrows.

Figure 5 is a detailed view of the front portion of the fuselage shown in Figure 4.

Figure 6 is a view taken along line 6—6 of Figure 5, looking in the direction of the arrows.

Figure 7 is a view taken along line 7—7 of Figure 5, looking in the direction of the arrows.

As best shown in the drawings, my invention consists of a fuselage of the monocoque type, generally designated by the numeral 1, which is provided with an outer skin 2. The outer skin 2 is supported by internal structural members, generally designated by the numeral 3, which consist of bulkheads 4, frames 5 and longerons 6. Situated in either side of the fuselage 1 is a pair of wing ribs 7 by means of which the main airfoil 8 is attached to the fuselage 1. Carried within the wing ribs 7 is a front wing beam 9 and a rear wing beam 10 which furnish the main support for the airfoil 8.

As best shown in Figure 2, a portion of the outer skin 2 which is situated beneath the fuselage 1 consists of a plurality of cowlings 11. These cowlings may be secured to the remaining portion of the outer skin 2 by headed bolts, such as shown at 12, or other suitable means. An escape hatch 13 is also provided in the under surface of the fuselage 2 forward of the cowlings 11.

As best shown in Figures 3 and 4, the principal flooring structure, generally designated by the numeral 15, consists of a portion 16 situated forward of the front wing beam 9 which may be used by the pilot and co-pilot and a portion 17 situated rearwardly of the rear wing beam 10 which may be used by the radio operator and be adapted to carry his equipment.

As best shown in Figure 6, this flooring structure 15 consists of a sheet of metal 18 which is mounted on hat-shaped stringers 19 to which it is secured by bolts 20 or other suitable means.

The hat-shaped stringers 19 are mounted on floor beams 21 which are riveted to fuselage frames 22. The floor beams 21 are further supported by angles 23 which are also rigidly attached to the fuselage frames 22. The construction provides not only a flooring for the fuselage but also a storage compartment 24 which is made readily accessible from the exterior of the ship by the removal of the cowlings 11.

Both the forward and rear portions of the flooring 16 and 17 are constructed in the manner described above and the storage space 24 extends under both of these portions. The hat-shaped members 19 under each portion of this flooring extend longitudinally of the airplane. The hat-shaped members supporting the flooring portion 16 are rigidly attached to the front wing beam 9 as shown at 25, and the corresponding hat-shaped members 19 which support the floor portion 17 are rigidly attached to the rear wing beam 10 as shown at 26.

As best shown in Figures 3 and 7, a raised flooring construction 27 is provided in the nose of the fuselage forward of the escape hatch 13 and the removable cowlings 11. This flooring construction is similar to that of the main flooring portions 16 and 17 except that two complete floor structures 28 and 29 are provided. The construction provides space for necessary fixed equipment such as servo-motors (not shown) for automatic control of the airplane. The compartment 24 may be used to house other fixed equipment as oxygen and flotation tanks, piping, etc. to which periodic access is required.

The floorings 18, 28 and 29 are further strengthened by being rigidly secured to the outer skin 2 of the fuselage by means of angles 30. This construction is an additional means to form the floor structure, fuselage structure, and skin into a single unit.

From the above description it is believed apparent that the two main flooring portions 16 and 17 which are situated forward and aft of the main airfoil provide a structure which replaces the fuselage skin beneath the floor which is in the form of removable cowlings. This construction not only provides compartments beneath the floor for fixed equipment which is readily accessible from the ground by entrance through the removable cowling, but also provides a structural means for strengthening the internal structure of the fuselage. By the use of this design additional usable space is provided without increasing the size of the fuselage.

The main flooring forward of the escape chute 13 is raised and the monocoque structure of the fuselage is further strengthened by an additional bracing member construction similar to and located beneath the raised flooring.

While for purposes of illustration I have shown one method by which the fuselage which forms the basis of this invention may be constructed, it is obvious that various changes can be made in the manner in which the structural members are attached and braced and in the form of the cowling without departing from the spirit of the invention. I, therefore, wish it understood that I desire only to be limited by the prior art and the scope of the appended claims.

I claim:
1. An airplane comprising a fuselage of monocoque structure, frames and an outer skin mounted on said frames, a pair of wing ribs mounted on opposite sides of the fuselage, a wing beam connecting the said wing ribs and extending transversely through the fuselage, a flooring attached to the said outer skin, a plurality of beams extending transversely across the fuselage and attached to the frames, and a plurality of beams mounted on the first mentioned beams and extending longitudinally of the fuselage, said longitudinally extending beams being attached to the wing beam and forming a support for said flooring.

2. An airplane comprising a fuselage of monocoque structure, frames and an outer skin mounted on said frames, a pair of wing ribs mounted on opposite sides of the fuselage, a wing beam connecting the said wing ribs and extending transversely through the fuselage, a raised flooring attached to the said outer skin, a compartment beneath the floor, said compartment being bounded by the outer skin and the raised flooring, the outer skin which forms the compartment being in the form of a removable cowling, a plurality of beams extending transversely across the fuselage and attached to the frames, and a plurality of beams mounted on the first mentioned beams and extending longitudinally of the fuselage, said longitudinally extending beams being attached to the wing beam and forming a support for said flooring.

3. An airplane comprising a fuselage of monocoque structure, frames and an outer skin mounted on said frames, a pair of wing ribs mounted on opposite sides of the fuselage, front and rear wing beams connecting the said wing ribs and extending transversely through the fuselage, and a flooring positioned forward of the front wing beam and attached to the outer skin, a plurality of beams extending transversely across the fuselage and attached to the frames, and a plurality of beams extending longitudinally of the fuselage and attached to the front wing beam, said longitudinally and transversely extending beams forming a support for the said flooring.

4. An airplane comprising a fuselage of monocoque structure, frames and an outer skin mounted on said frames, a pair of wing ribs mounted on opposite sides of the fuselage, front and rear wing beams connecting the said wing ribs and extending transversely through the fuselage, and a flooring positioned rearwardly of the rear wing beam and attached to the outer skin, a plurality of beams extending transversely across the fuselage and attached to the frames, and a plurality of beams extending longitudinally of the fuselage and attached to the rear wing beam, said longitudinally and transversely extending beams forming a support for the said flooring.

5. An airplane comprising a fuselage of monocoque structure, frames and an outer skin mounted on said frames, a pair of wing ribs mounted on opposite sides of the fuselage, front and rear wing beams connecting the said wing ribs and extending transversely through the fuselage, and a pair of floorings, one positioned forward and one aft of the said wing beams, each of said floorings being attached to the outer skin, and being supported by identically constructed supporting structures which consist of a plurality of beams extending transversely across the fuselage, said beams being attached to the frames, and a plurality of beams extending longitudinally of the fuselage and mounted on said first mentioned beams, said longitudinally extending beams supporting the forward flooring being attached to the front wing beam and the said longitudinally extending beams supporting the rear flooring being attached to the rear wing beam.

6. An airplane comprising a fuselage of monocoque structure, frames and an outer skin mounted on said frames, a pair of wing ribs mounted on opposite sides of the fuselage, front and rear wing beams connecting the said wing ribs and extending transversely through the fuselage, a pair of floorings raised above the skin forming the lower portion of the fuselage, one of said floorings being positioned forward and one aft of the said wing beams and being supported by identically constructed supporting structures which consist of a plurality of beams extending transversely across the fuselage, said beams being attached to the frames, and a plurality of beams extending longitudinally of the fuselage and mounted on said first mentioned beams, said longitudinally extending beams which support the forward flooring being attached to the front wing beam and the said longitudinally extending beams which support the rear flooring being attached to the rear wing beam, and a third flooring positioned in the nose of the fuselage at a level above the said forwardly positioned flooring, transversely extending beams attached to the said frames, and longitudinally extending beams mounted on said first mentioned beams and supporting said flooring.

7. An airplane comprising a fuselage of monocoque structure, frames and an outer skin mounted on said frames, a plurality of wing ribs mounted on opposite sides of the fuselage, a wing beam connecting the said wing ribs and extending transversely through the fuselage, a flooring attached to the said outer skin, a plurality of beams extending transversely across the fuselage and attached to the frames, and a plurality of beams mounted on the first mentioned beams and extending longitudinally of the fuselage, said longitudinally extending beams being attached to the wing beam and forming a support for said flooring.

8. An airplane comprising a fuselage of monocoque structure, frames and an outer skin mounted on said frames, a plurality of wing ribs mounted on opposite sides of the fuselage, front and rear wing beams connecting the said wing ribs and extending transversely through the fuselage, a pair of floorings raised above the skin forming the lower portion of the fuselage, one of said floorings being positioned forward and one aft of the said wing beams and being supported by identically constructed supporting structures which consist of a plurality of beams extending transversely across the fuselage, said beams being attached to the frames, and a plurality of beams extending longitudinally of the fuselage and mounted on said first mentioned beams, said longitudinally extending beams which support the forward flooring being attached to the front wing beam and the said longitudinally extending beams which support the rear flooring being attached to the rear wing beam, and a third flooring positioned in the nose of the fuselage at a level above the said forwardly positioned flooring, transversely extending beams attached to the said frames, and longitudinally extending beams mounted on said first mentioned beams and supporting said flooring.

ROBERT J. WOODS.